United States Patent [19]
Zimmerman et al.

[11] Patent Number: 6,061,968
[45] Date of Patent: May 16, 2000

[54] METHOD AND APPARATUS FOR ENABLING AN OPENING AND CLOSING OF A HINGED DOOR

[75] Inventors: Leon S. Zimmerman; George S. Zimmerman, both of Lititz, Pa.

[73] Assignee: Staco, Inc., Schaefferstown, Pa.

[21] Appl. No.: 09/294,750

[22] Filed: Apr. 19, 1999

[51] Int. Cl.[7] ...................................................... E06B 3/00
[52] U.S. Cl. ............................................. 49/506; 29/897.3
[58] Field of Search ............................. 49/501, 506, 460; 29/897, 897.3, 401.1, 525.01, 525.06, 525.11

[56] References Cited

U.S. PATENT DOCUMENTS

| | | | |
|---|---|---|---|
| 479,331 | 7/1892 | McGregor | 29/897.3 X |
| 3,763,918 | 10/1973 | Clark | 29/879.3 X |
| 5,492,082 | 2/1996 | Krevinghaus et al. | |
| 5,553,354 | 9/1996 | Trulaske | 49/501 X |

OTHER PUBLICATIONS

"The New Generation From Chore–Time" brochure; six (6) pages; Chore–Time Equipment.
Chore–Time "Tunnel Ventilation System" Air Systems brochure; one (1) sheet; Chore–Time Equipment.
"Button Nipple Drinker" brochure; two (2) sheets; Chore–Time Equipment.
"Ultrapan® Pullet and Breeder Feeder" brochure; two (2) sheets; Chore–Time Equipment.

*Primary Examiner*—Jerry Redman
*Attorney, Agent, or Firm*—Harness, Dickey & Pierce, P.L.C.

[57] ABSTRACT

A method and apparatus for enabling an opening and closing of a hinged door includes a first member and a second member. The first member extends substantially along a first plane. The second member extends substantially along the first plane when in a first position and extends substantially along a second plane when in a second position. When the second member is in the second position, the second member deformably projects from the first member.

18 Claims, 11 Drawing Sheets

METHOD AND APPARATUS FOR ENABLING AN OPENING AND CLOSING OF A HINGED DOOR

BACKGROUND OF THE INVENTION

1. Field of the Invention

This invention relates generally to a method and apparatus for enabling an opening and closing of a hinged door and, more particularly, to a method and apparatus for enabling an opening and closing of a ventilation door used in a poultry house or hog barn.

2. Discussion of the Related Art

In various industries such as those involving agriculture, it is often necessary to circulate relatively large amounts of air through a building to help maintain the interior of the building within a desired temperature range and to provide adequate ventilation. One such application where ventilation and control of the temperature within a building is extremely important is in connection with poultry houses. Such facilities are typically used to house chickens which are being grown for eventual slaughter or which are being used for egg production. Turkeys are also commonly kept in such poultry houses, although turkeys have been found to be somewhat less sensitive than chickens to large variations in the ambient temperature within the poultry house.

In a large scale poultry house, typically twenty thousand to twenty-five thousand chickens may be housed at a given time. If a poultry house is not properly ventilated, and the ambient temperature within it not properly controlled, the respiration of the chickens and the waste by-products within the poultry house can quickly give rise to a build up of ammonia and heat within the house which may be physiologically detrimental to the chickens. In extreme cases, such as where adequate ventilation and/or cooling is not provided on hot summer days, significant animal mortality may result. Even if mortality does not result, repeated lapses of proper ventilation and/or cooling can produce significant physiological stress on the chickens that result in inhibited growth, reduced egg production, and/or disease. Any of the above conditions may result in significant financial losses to a poultry farmer.

The problem with providing proper ventilation and cooling within a poultry house is exacerbated by the physiological differences between poultry of different ages. For example, very young chickens, hereafter referred to as "chicks", are more tolerant of higher temperatures than older chickens but also more sensitive to lower temperatures. It has been found that chicks suffer abnormal mortality below about 68°–70° F. However, chicks tolerate temperatures into the high 80° F. range quite well. More mature chickens, however, are much more tolerant of lower temperatures but become more susceptible to mortality as the ambient temperature within a poultry house without proper ventilation and cooling, reaches into the 80° F. range. Since chicks and more mature chickens must be housed in the same poultry house, this further increases the criticality of maintaining proper ventilation and a predetermined temperature range within the poultry house.

Further complicating the control of ventilation and temperature within poultry houses is the significant temperature swings experienced during many summer months and during various parts of the day. For example, during the summer months the outside temperature is typically warmest between about 2:00 p.m. and 5:00 p.m. In the early evening, such as around 5:00 p.m., any slight wind or breeze present during the day typically dies down. Accordingly, the heat build up within a poultry house without proper cooling can become critically high. Simultaneously, since little or no breeze is present, ventilation within the poultry house, can also become critically poor, leading to an unacceptably high level of ammonia buildup in the building. Within a matter of hours, however, as evening approaches, the ambient temperature may drop significantly. Thus, the need for significant cooling within the poultry house may lessen or be completely eliminated. In this instance, adequate ventilation may be accomplished without the use of power driven cooling implements such as fans. The same situation may arise with the approach of an afternoon thunderstorm. The ambient temperature may drop significantly within a matter of an hour or less while the wind speed of the ambient air may increase significantly.

The above considerations dictate that a plurality of ventilation and cooling devices be used to insure proper ventilation and relatively close control over the ambient temperature within a poultry house. Typically, this requires the use of one or more passive or active ventilation devices be used in the poultry house. Such devices typically include power driven curtains for opening large portions of the poultry house, elongated ventilation opening extending about the upper periphery of the poultry house to provide additional cross ventilation through the poultry house, and various ventilation and exhaust fans disposed within the poultry house, as well as about various walls of the poultry house for drawing air into and through the poultry house, via the large curtained openings and/or the elongated ventilation openings. Typically, each elongated ventilation opening includes a ventilation door and frame assembly that is framed into the wall of the poultry house. To control the opening and closing of the ventilation doors, a pulley and linkage system driven by a motor is coupled to each ventilation door by means of a bracket extending from each hinged door.

While the existing brackets on the ventilation doors work well in connecting the ventilation doors with the pulley and linkage system, there are, however, several disadvantages associated with the use of the currently existing brackets. For example, since the brackets extend out several inches from the ventilation doors, the brackets are prone to being bent or broken off during packaging and transport. Because of this, each bracket is packaged separately from the ventilation door to reduce the chance of damage. The un-assembled bracket, however, causes additional disadvantages. In this regard, a poultry house will generally have several dozen ventilation doors. As a result, several dozen individual brackets, as well as several hundred pop rivets or sheet metal screws used to secure the brackets must be subsequently assembled to the ventilation doors by use of tools after the ventilation doors have been installed into the poultry house. This installation process is very time consuming and thereby prone to improper assembly.

What is needed then is a method and apparatus for enabling an opening and closing of a ventilation door used in a poultry house which does not suffer from the above mentioned disadvantages. This will, in turn, eliminate the need to separately ship the door bracket, eliminate subsequent assembly of the door bracket, eliminate the need for utilizing pop rivets or sheet metal screws during the assembly, eliminate the possibility of losing separate brackets or hardware, eliminate the need for tools to put the bracket into operation, reduce the installation time and complexity, reduce the potential of damaging the bracket during packaging and shipping, and reduce the overall installation cost by reducing a significant installation step. It is, therefore, an object of the present invention to provide such a method and apparatus for enabling an opening and closing of a ventilation door used in a poultry house.

SUMMARY OF THE INVENTION

In accordance with the teachings of the present invention, a method and apparatus for enabling an opening and closing of a hinged door used in a poultry house is provided. This is basically achieved by providing a bracket which is substantially flush with the hinged door and is operable to be bent to deformably project from the hinged door. Alternatively, the bracket may be located in a first non-operative position and be placed in a second operative position without the use of tools.

In one preferred embodiment, an apparatus for enabling an opening and closing of a hinged door includes a first member and a second member. The first member extends substantially along a first plane. The second member extends substantially along the first plane when in a first position and extends substantially along a second plane when in a second position. The second member is in the second position when deformably projecting from the first member.

In another preferred embodiment, an apparatus for enabling the opening and closing of a hinged door includes a body member and a deformable region. The body member includes a proximal end and a distal end. The proximal end is coupled to the hinged door and the distal end cantilevers from the hinged door. The deformable region is located at the proximal end of the body member and is operable to enable the body member to cantilever from the hinged door along a plurality of planes.

In yet another preferred embodiment, a method for using an apparatus for enabling an opening and closing of a hinged door is set forth. This method includes providing a body member that is movably coupled to the hinged door and positioned substantially flush with the hinged door. The body member is then bent so that the body member substantially projects out from the hinged door.

In yet another preferred embodiment, a method for using an apparatus for enabling an opening and closing of a hinged door is set forth. This method includes providing a hinged door operable to be opened and closed and a body member for assisting in the mechanical opening and closing of the hinged door. The body member is positioned from a first non-operative position to a second operative position relative to the hinged door without the use of a tool to permit the mechanical opening and closing of the hinged door.

In another preferred embodiment, an apparatus for enabling an opening and closing of a hinged door includes at least one recess and a body member. The at least one recess is defined by at least a portion of the hinged door. The body member includes at least one projection extending from the body member where the projection is operable to be nestingly and matingly engaged with the at least one recess. Upon nesting and mating the projection within the recess, the body member is fixedly secured and cantilevered from the hinged door.

In still another preferred embodiment, an apparatus for enabling an opening and closing of a hinged door includes at least one projection member and a body member. The at least one projection member extends from the hinged door and the body member defines at least one recess. The projection member is operable to be nestingly and matingly engaged within the recess such that upon nesting and mating the projection member within the recess, the body member is fixedly secured and cantilevered from the hinged door.

Use of the present invention provides a method and apparatus for enabling an opening and closing of a hinged door. As a result, the aforementioned disadvantages associated with the prior art assemblies and techniques have been substantially reduced or eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiments concerning a method and apparatus for enabling an opening and closing of a ventilation door used in a poultry house are merely exemplary in nature and are not intended to limit the invention or its application or uses. Moreover, while the present invention is described in detail below with reference to a bracket for use with a ventilation door and frame assembly used in a poultry house, it will be appreciated by those skilled in the art that the bracket described herein may be adapted for use with a wide variety of hinged doors.

Figure 1:
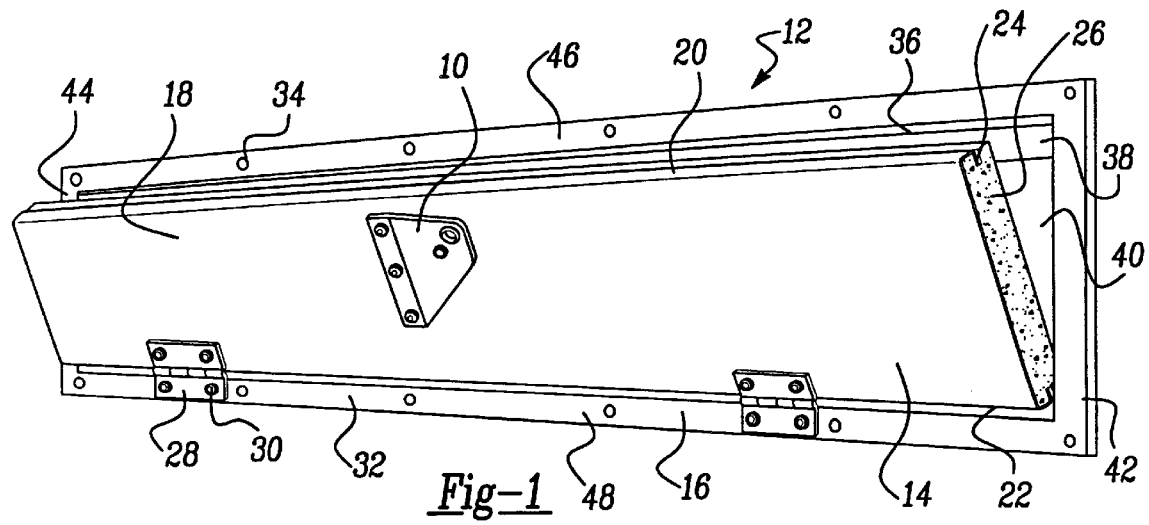
FIG. 1 is a perspective view of a ventilation door and frame assembly utilizing a bracket according to the teachings of one preferred embodiment of the present invention.
Figure 2:
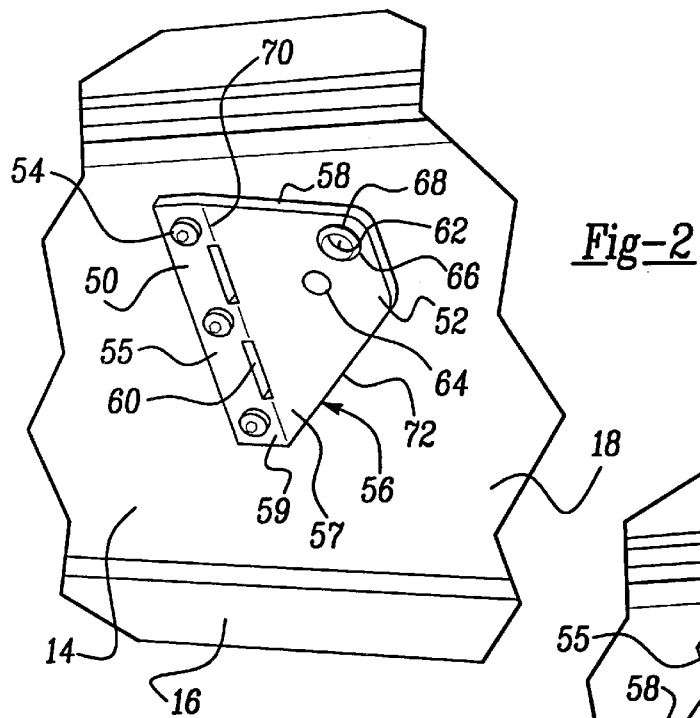
FIG. 2 is an enlarged perspective view of the bracket shown in FIG. 1 being in a substantially planar state.
Figure 3:
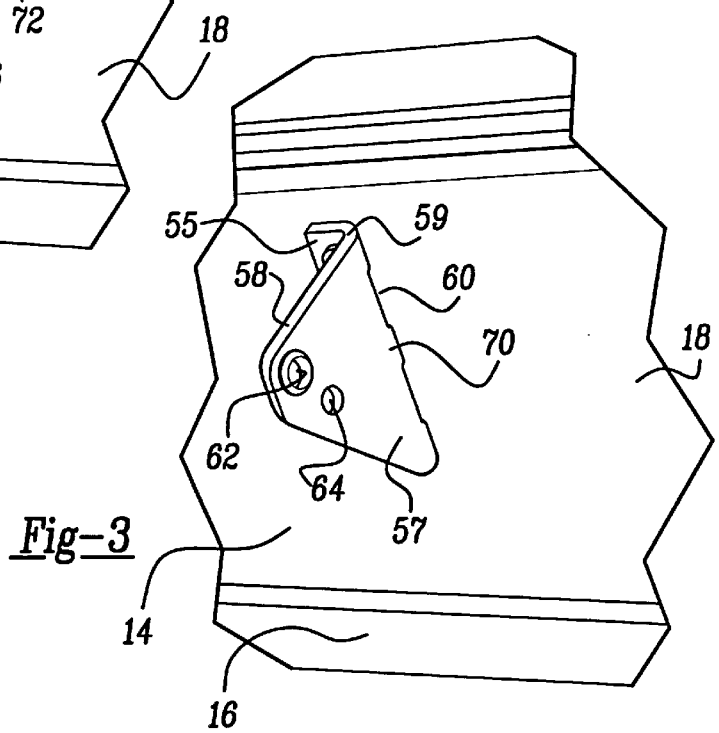
FIG. 3 is an enlarged perspective view of the bracket shown in FIG. 1 being in a substantially angled state.

Referring to FIGS. 1–3, an apparatus or bracket 10 for use in a ventilation door and frame assembly 12 according to the teachings of a first preferred embodiment in the present invention is shown. The ventilation door and frame assembly 12 includes a ventilation door 14 and a frame 16. Both the ventilation door 14 and the frame 16 are preferably formed from twenty-two (22) gauge galvanized steel to prevent and inhibit corrosion of the ventilation door and frame assembly 12. The ventilation door 14 includes a substantially elongated and rectangular front face or member 18 that is about 36 inches long and about 6 inches high. Of course, the dimensions provided herein are merely exemplary and any other appropriate sizes may also be used. Extending longitudinally along the ventilation door 14 is a top flange 20 and a bottom flange 22. Each flange 20 and 22 includes a bent channel 24 adapted to slidably and snugly receive an insulation panel 26. The insulation panel 26 is preferably styrofoam or any other appropriate insulating material.

The ventilation door 14 is pivotably attached to the frame 16, via a pair of stainless steel hinges 28. The hinges 28 are secured adjacent to the bottom flange 22 and the frame 16, via rivets 30. The hinges 28 enable the ventilation door 14 to be opened approximately 180° relative to the frame 16. The frame 16 is formed to nestingly receive the ventilation door 14 and includes an external rectangular flange or lip 32 having a plurality of holes 34 to enable the ventilation door and frame assembly 12 to be installed in a poultry house, further discussed herein. Extending substantially perpendicular to the rectangular lip 32 is a rectangular sidewall 36. Extending substantially perpendicular to the sidewall 36 is a substantially rectangular internal lip or ledge 38 that defines a ventilation opening 40.

The frame 16 is preferably formed from individual right and left members 42 and 44 and individual top and bottom members 46 and 48 that are assembled by any appropriate means such as riveting, stamping, welding, etc. A single stamped or formed frame 16 could also be utilized. In this regard, while the door 14 and the frame 16 are preferably formed from twenty-two (22) gauge galvanized steel, the door 14 and the frame 16 may be formed or stamped from single components or multiple components, as well as be formed from various types of material such as steel, wood, plastic, etc.

Referring in particular to FIG. 2, the apparatus or bracket 10 includes a proximal end 50 and a distal end 52. The bracket 10 is secured or coupled to the door 14 along the proximal end 50 by a fastening mechanism such as rivets 54 or any other appropriate fastening mechanism, such as screws, welding, glue, integral, etc. The bracket 10 is preferably formed from twenty-two (22) gauge stainless steel to inhibit corrosion or any other appropriate material, such as galvanized steel, plastic, etc. The bracket 10 is also preferably pre-assembled to the door 14 and shipped in a substantially flat condition, as shown in FIG. 2.

The bracket 10 includes a substantially planar body member 56 that is bounded by a sidewall 58 having five sides. The bracket 10 also includes a first member 55 and a second member 57. Located adjacent to the proximal end 50 and between the first member 55 and the second member 57, is a deformable or bendable region 59. The bendable region 59 includes a pair of elongated openings 60 defined by the body member 56 which extend between and adjacent to the rivets 54. The openings 60 assist in promoting the bending of the bracket 10 along the bendable region 59 adjacent to the proximal end 50. The bendable region 59 may also include any other type of structure to enable easy bending or deforming of the body member 56 in this region generally without the use of tools, such as scoring, notching, thinned region, etc.

Located at the distal end 52 of the bracket 10 is a first attachment mechanism or circular bore 62 and a second attachment mechanism or circular bore 64, each defined by the body member 56. The circular bore 62 includes a protective tubular sleeve 66 formed from plastic and retained within bore 62, via a pair of opposed flexible flanges 68 that define an annular channel for receipt of the body member 56 or any other protective member. The sleeve 66 eliminates the internal sharp edges of the bore 62 so that a cable or linkage can be easily and safely coupled to the bracket 10, further discussed herein. In this regard, the protective member 66 may also be a rubber grommet, rolled metal edge or any other type of member capable of eliminating any sharp internal edges. The bore 64 provides a means for conveniently attaching an optional weight to bias the door 14 in an opened condition. Should the optional weight be used, a protective member 66 may be employed in the bore 64. While bores 62 and 64 are shown as attachment mechanisms for a cable and weight, any other type of attachment mechanism is also contemplated.

As shown in FIG. 3, once the ventilation door and frame assembly 12 is installed in a poultry house or any other structure, the bracket 10 is bent and deformed along the bendable region 59 without the use of a tool. This bending and deforming of the body member 56 occurs adjacent to the proximal end 50 and substantially along the elongated openings 60, via bendable hinge areas 70. This structure enables the bracket 10 to be packaged and shipped in a substantially flat and flush condition relative to the door 14, thereby substantially preventing damage to the bracket 10 during the packaging or shipping of the ventilation door and frame assembly 12. Once installed, the bracket 10 is easily and quickly bent or deformed to put the bracket 10 into operation.

In this regard, the body member 56 extends substantially along the same plane that the face 18 of the door 14 extends. In this first non-operative position, the bracket 10 is substantially flush with the door 14 and the body member 56 has not been deformed along the bendable region 59. Once installed, the bendable region 59 enables the bracket 10 or the second member 57 to cantilever from the hinged door 14 along a plurality of planes relative to the plane of the door 14. Preferably, the body member 56 is deformed in a second operative position that projects from the door 14 substantially perpendicular to the plane of the door 14 with the first member 55 extending substantially along the plane of the door 14. This structure eliminates the need for shipping a separate bracket which could be lost or damaged during shipping, as well as eliminates the need for assembling the bracket once the door and frame assembly 12 has been installed into the particular structure. The bracket 10 is preferably bent such that the body member 56 or the second member 57 extends substantially perpendicular to the door 14 with the distal end 52 extending out from the door 14 by about four inches. An angled sidewall 72 cantilevers out from the door 14 by about 45° to provide an unobstructed area for hanging the optional weight from the bore 64 should this be desirable.

Figure 4:
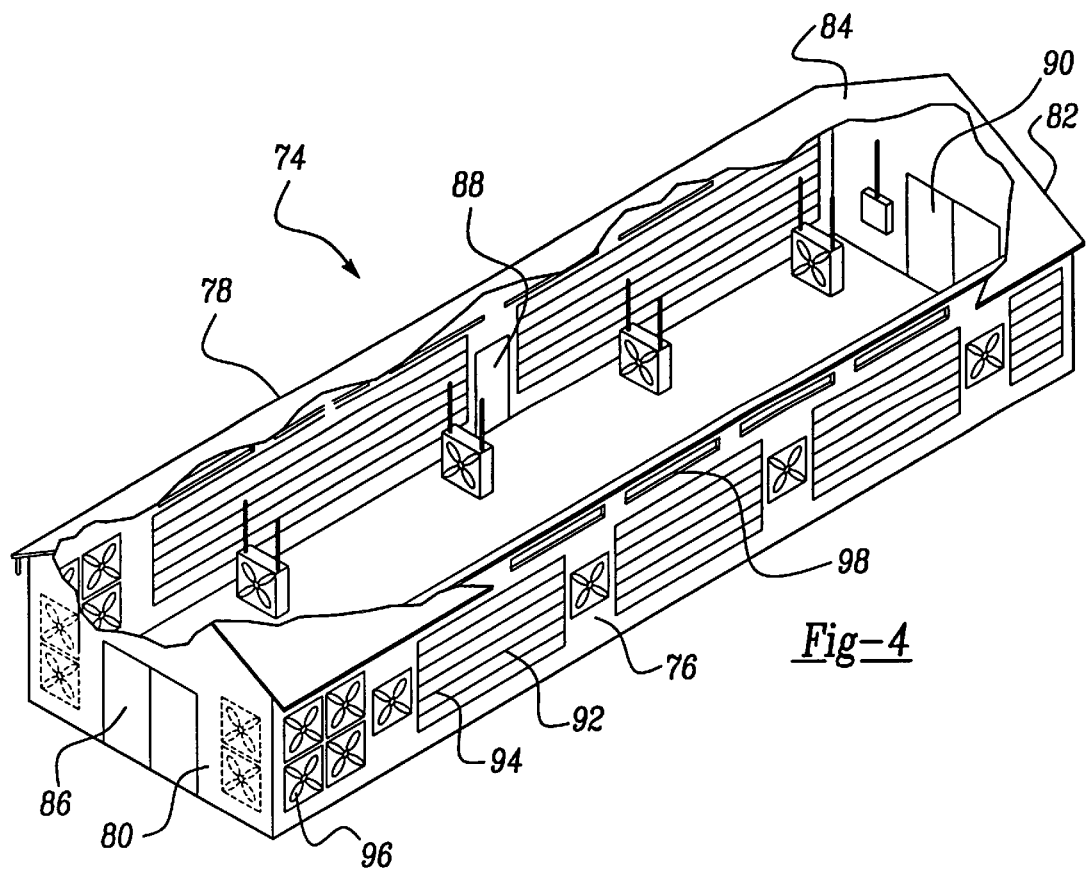
FIG. 4 is a perspective view of a poultry house illustrating various components within the poultry house, including the ventilation door and frame assembly of FIG. 1.
Figure 5:
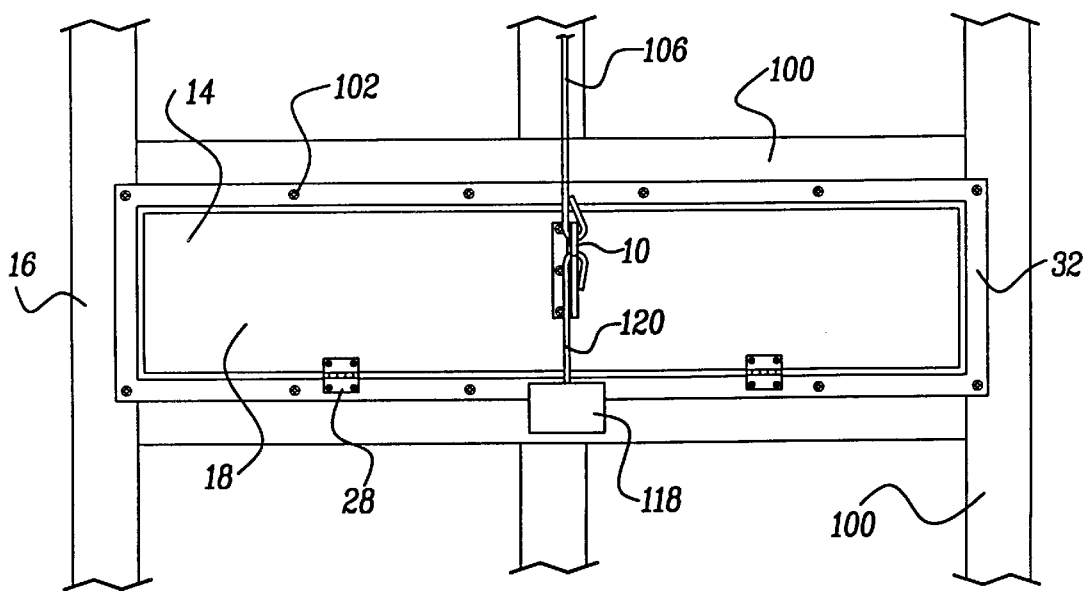
FIG. 5 is a front view of the ventilation door and frame assembly shown installed in a wall of the poultry house of FIG. 4.
Figure 6:
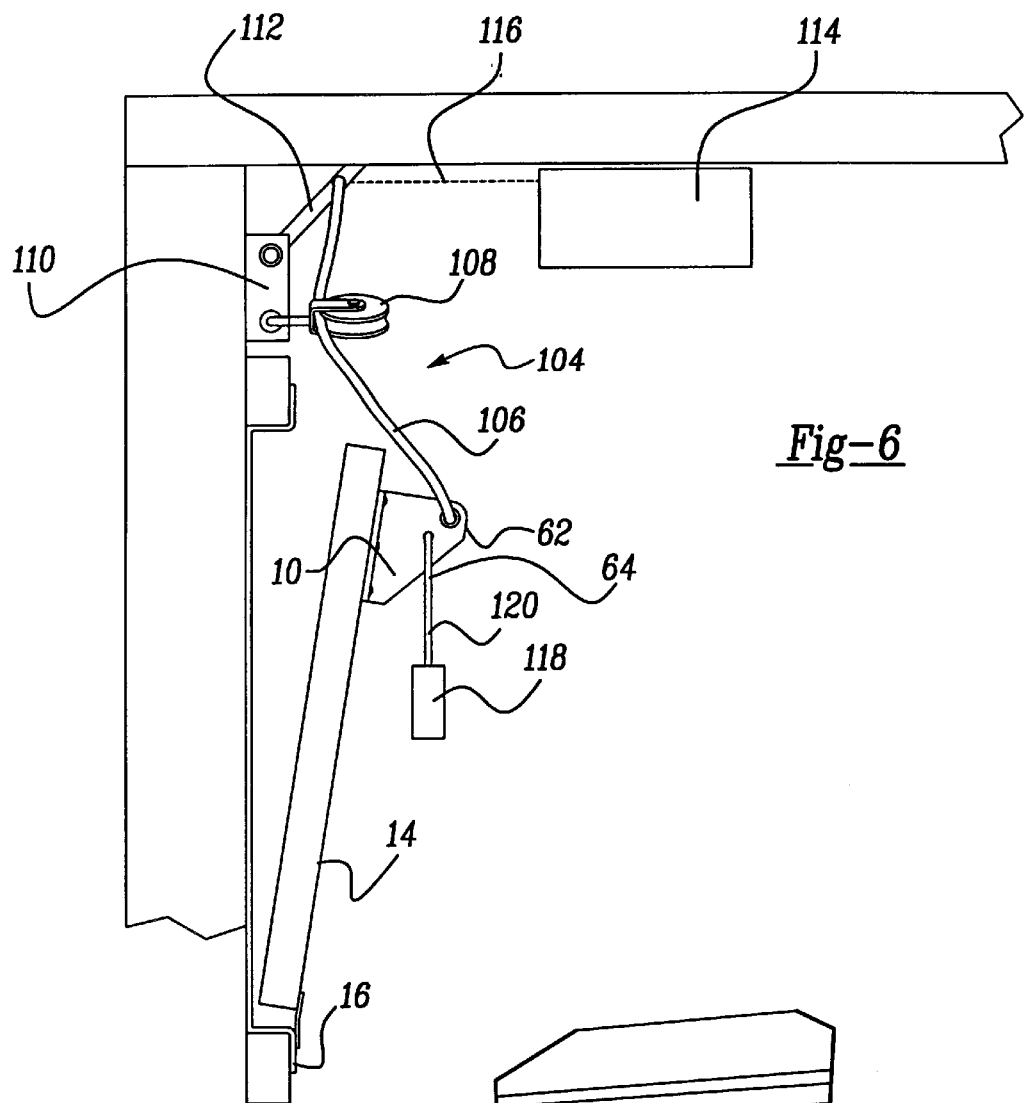
FIG. 6 is a side cross-sectional view of the ventilation door and frame assembly shown installed in the wall of the poultry house of FIG. 4.

Turning now to FIGS. 4–6, the bracket 10 and procedure for using the bracket 10 will now be described with respect to a poultry house 74. Here again, while the bracket 10 attached to the ventilation door and frame assembly 12 is described with respect to the poultry house 74, the bracket 10 and/or the door and frame assembly 12 may be used with various other structures for housing a wide variety of animals or any other type of structure requiring ventilation. The poultry house 74 includes a pair of opposing sidewalls 76 and 78, a front wall 80, a rear wall 82 and a roof 84. The sidewalls 76 and 78 may vary greatly in length but, for a large scale poultry house 74, are typically about four-hundred feet in length. The front wall 80 and the rear wall 82 also vary significantly in length but are typically about forty feet in length for a large scale poultry house 74. The front wall 80 will generally include a door 84 for accessing the interior of the poultry house 74. A side door 88 will also generally be provided about mid-portion the length of one of the sidewalls 76 or 78. A rear door 90 may also be provided in the rear wall 82.

Each sidewall 76 and 78 is about eight to ten feet in height and may include a plurality of openings 92 over which motor driven curtains 94 are disposed. Each of the curtains 94 are capable of being raised (i.e., closed) and lowered (i.e., opened) in a conventional fashion by an electrically driven motor or in a controlled fashion. A plurality of fans 96 are also shown associated with the various sidewalls and the interior of the poultry house 74. The fans 96 are used for circulating air throughout the poultry house 74. Extending substantially along the upper portion of sidewalls 76 and 78 are elongated openings 98 which each receive a ventilation door and frame assembly 12. These openings 98 provide further ventilation of the poultry house 74 and may be manually or controllably opened, via the ventilation door and frame assembly 12. Automated control of the openings 92 and 98 along with control of the fans 96 may be performed utilizing an electronic controller system such as that disclosed in U.S. Pat. No. 5,492,082, which is hereby incorporated by reference.

Referring to FIG. 5, the internal portion of a sidewall 76 is shown with the ventilation door and frame assembly 12 mounted therein. In this regard, the ventilation door and frame assembly 12 is mounted to the interior of the sidewall 76 by means of mounted studs 100 or other appropriate fixation members. To secure the ventilation door and frame assembly 12, the lip 32 of the frame 16 is positioned along the studs 100 forming a portion of the sidewall 76. Once positioned along the studs 100, the frame 16 is fixedly secured, via nails or screws 102 passing through the bores 34 in the lip 32.

A linkage mechanism 104 is shown in FIG. 6 for opening and closing the door 14 relative to the poultry house 74. The linkage mechanism 104 includes a cable 106 that is coupled to the bore 62 in the bracket 10. The cable 106 is routed about a pulley 108 that is secured to a bracket 110. Extending from the bracket 110 is a rigid linkage member 112 which pivots relative to the bracket 110 and is tied to the cable 106. A motor 114 is in communication with the linkage member 112, via linkage 116, to enable the adjustable opening and closing of the door 14. In this regard, when the motor 114 is turned on, the linkage 116 communicates with the linkage member 112 such that linkage member 112 pivots about bracket 110 in an upward or downward direction thereby causing the cable 106 to open or close the door 14. To assure that the door 14 opens, the door 14 may be optionally weighted with a weight 118 extending from the bore 64, via a cable 120. The weight 118 is preferably about 4 oz. to 8 oz. depending on the door size and biases the door 14 in an opened or ventilated condition.

In use, the ventilation door and frame assembly 12 is delivered to the site of the poultry house 74 with the bracket 10 already pre-assembled to the door 14 and positioned substantially flush with the door 14 and along substantially the same plane as the door 14. The ventilation door and frame assembly 12 is then secured to the sidewall 76 by securing the rectangular flange 32 of the frame 16 to the studs 100, via nails or screws 102. Once attached, the bracket 10 is simply bent along the bendable region 59 adjacent the elongated openings 60 without the use of tools such that the first member 57 of the bracket 10 deformably extends out substantially perpendicular to the door 14. The cable 106 is then coupled to the bore 62 and the weight 118 is coupled to the bore 64, via the cable 120. Once fully assembled, the door 14 may be opened by simply lowering the linkage member 112 or closed by raising the linkage member 112, via motor 114 and linkage 116.

Figure 7:
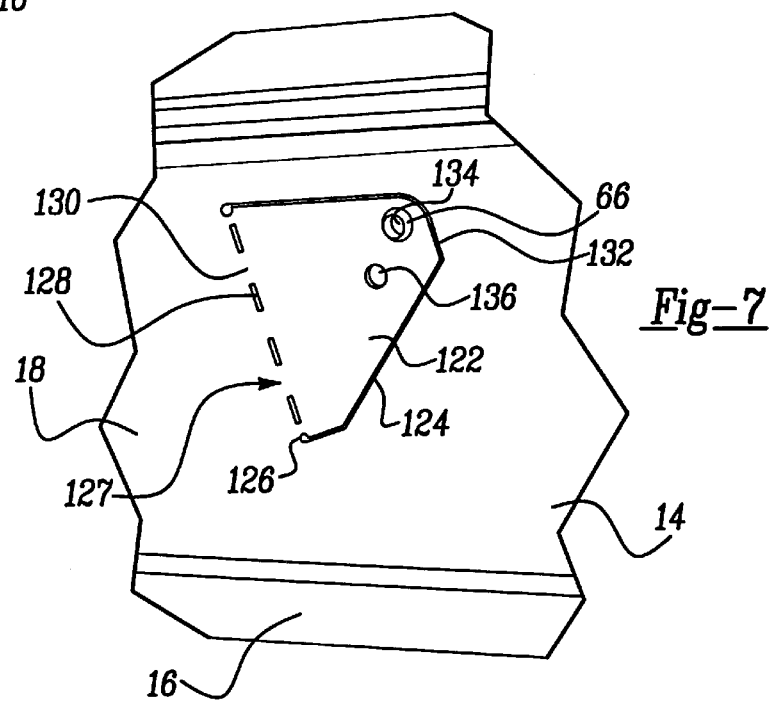
FIG. 7 is an enlarged perspective view of a bracket shown in a substantially planar state according to the teachings of a second preferred embodiment in the present invention.
Figure 8:
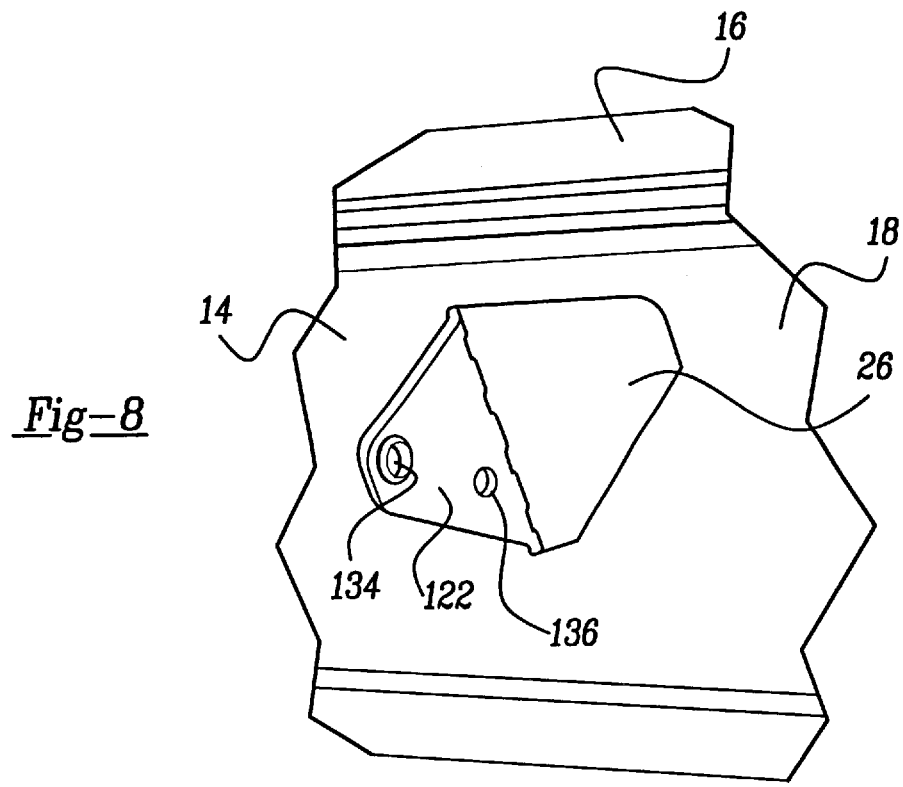
FIG. 8 is an enlarged perspective view of the bracket shown in FIG. 7 being in a substantially angled state.

A bracket 122 according to the teachings of a second preferred embodiment of the present invention is shown in FIGS. 7 and 8. In this regard, the bracket or body member 122 is not a separate bracket but is integral with the face 18 of the door 14. The bracket 122 is defined by cutting a shaped groove 124 into the face 18 of the door 14. Located at a proximal end 126 of the bracket 122 is a bendable region 127 defined by a plurality of elongated openings 128 formed to enable bending along bendable hinges 130 without the use of tools. Located at a distal end 132 of the bracket 122 is a first bore 134 having the protective member 66 and a second bore 136. Here again, the bore 134 may be coupled to the cable 106, while the bore 136 may be coupled to the weight 118, via cable 120.

In use, the bracket 122 is again shipped in a substantially flat and flush condition that extends along substantially the same plane as the door or the first member 14. Once the ventilation door and frame assembly 12 has been installed in the poultry house 74, the distal end 132 of the bracket 122 is simply grasped to bend and deform the bracket or the second member 122 along deformable and bendable hinge portions 130. The bracket 122 is again bent and deformed along the bendable region 127 to extend along an operative plane that is substantially perpendicular to the plane of the door 14. Thereafter, the ventilation mechanism 104 and the weight 118 are coupled to the bracket 122 similar to bracket 10.

Figure 9A:
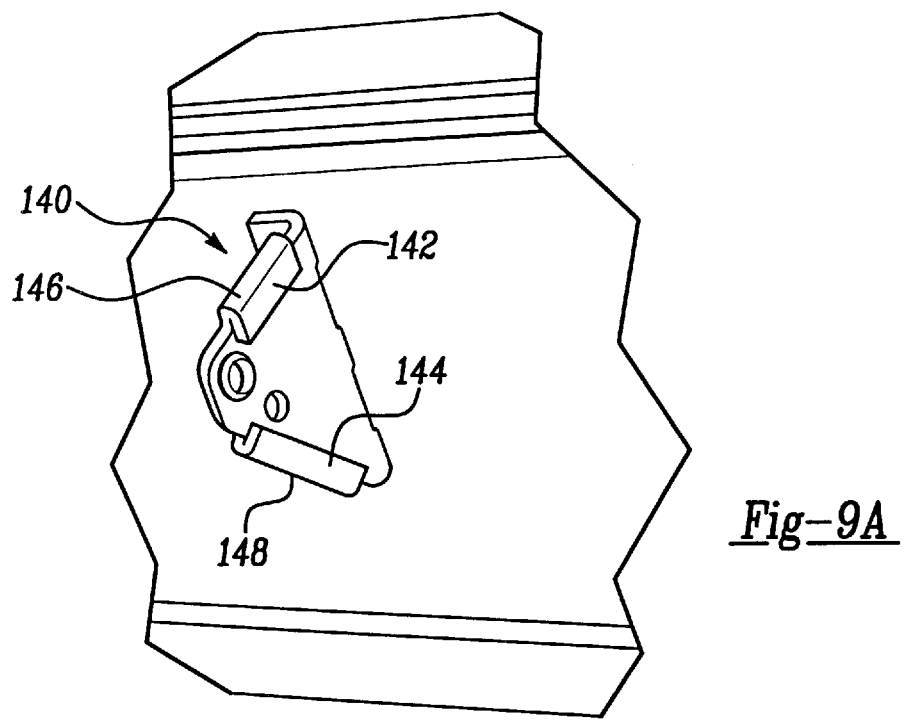
FIGS. 9a–9b illustrate a bracket according to the teachings of a third preferred embodiment.
Figure 9B:
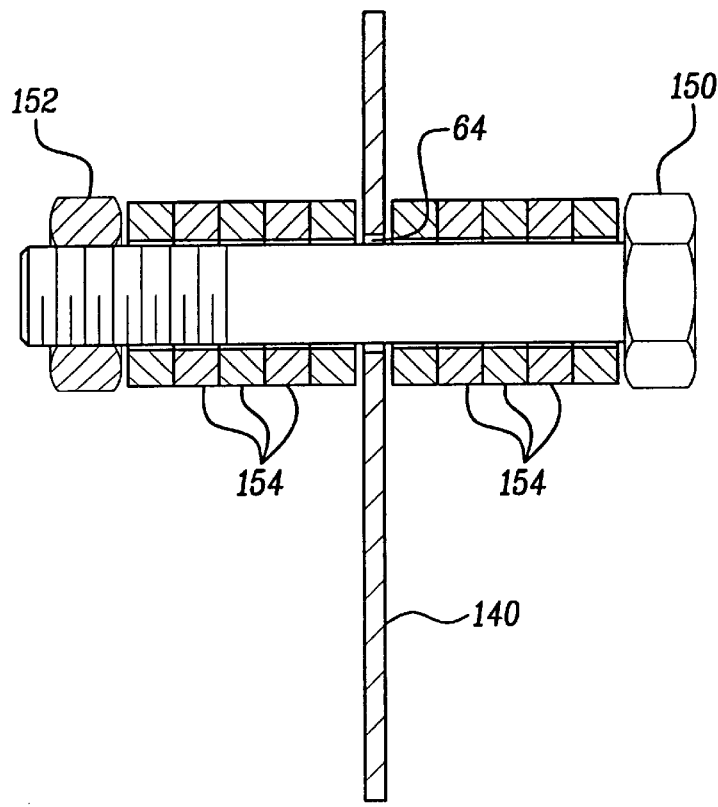

Turning to FIGS. 9a and 9b, a bracket 140 according to the teachings of a third preferred embodiment of the present invention is shown. In this regard, like reference numerals will be used to identify like structures with respect to the bracket 10. The bracket 140 is similar to the bracket 10 except that the bracket 140 includes a first weighting member 142 and a second weighting member 144. The first weighting member 142 is simply an extension of the original bracket 10 and is bent over along bending region 146 by 180°. Likewise, the second weighting member 144 is also simply an extension of bracket 10 or sidewall 58 and is bent over along bendable region 148 by 180°. This provides additional weight already built into the bracket 140 which may be sufficient to bias the door 14 in an open position depending on the size of the door 14.

Should additional weighting be required, a bolt 150 secured to the bracket 140 by way of a nut 152 may simply be inserted within the bore 64 to retain a plurality of washers 154. The number of washers can simply be varied to appropriately weight the door 14. This configuration eliminates the need for the weight 118 and cable 120. It should further be noted that while this type of weighting mechanism is shown associated with bracket 140, this type of weighting mechanism may also be employed with any of the brackets set forth herein. Alternatively, the length of any of the disclosed brackets may be adjustably extended to cantilever out from the door 14 by a greater or lesser distance to provide the appropriate moment arm for biasing the door 14 in an opened condition. In this way, any type of weighting mechanism may be simply eliminated should the particular bracket extend or cantilever out from the door 14 by a sufficient distance such as between the range of about 2 to 8 inches.

Figure 10A:
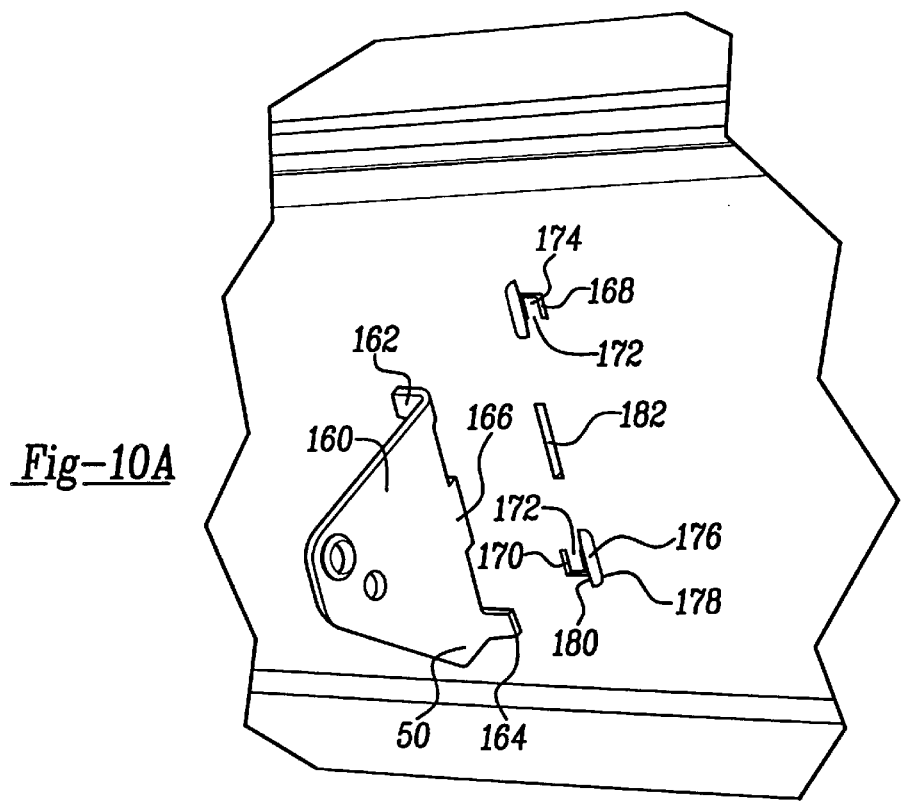
FIGS. 10a–10c illustrate a bracket according to the teachings of a fourth preferred embodiment of the present invention.
Figure 10B:
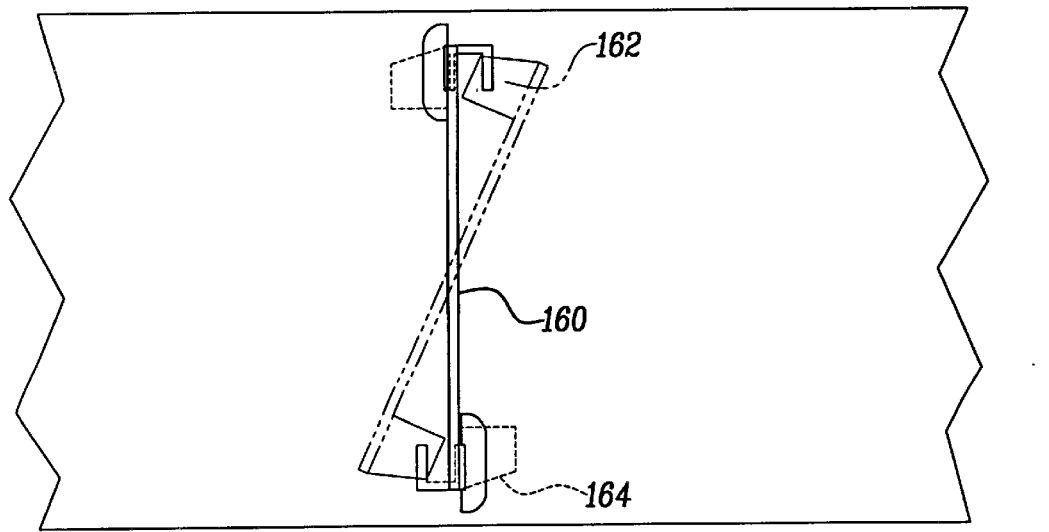
Figure 10C:
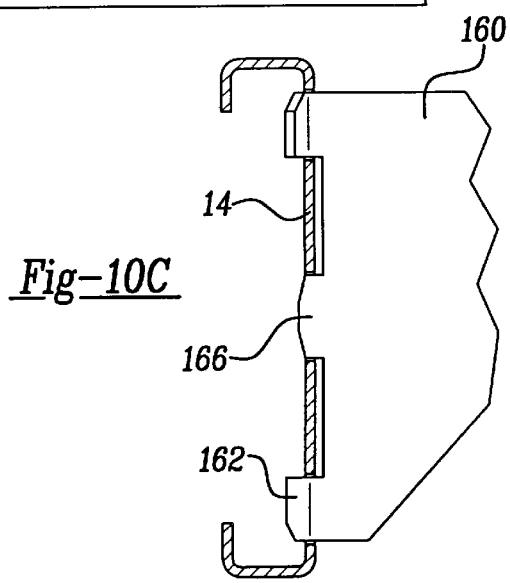

A bracket 160 according to the teachings of a fourth preferred embodiment of the present invention is shown in FIGS. 10a–10c. Here again, like reference numerals will be used to identify like structures with respect to bracket 10. The bracket 160 is shipped separate from the door 14 in a first non-operation position and installed on the door 14 on site to a second operation position. However, the bracket 160 may be quickly and easily secured to the door 14 without the use or need for any tools. This system further improves upon the prior art systems which require extensive labor and tools to install the bracket to the door. The bracket 160 is formed with a pair of bent tabs or projections 162 that are bent substantially perpendicular to the bracket 160. The projections 162 include an angled sidewall 164 which enables easy coupling of the bracket 160 relative to the door 14, further discussed herein. Located centrally along the proximal end 50 of the bracket 160 is a rectangular tab or projection 166 used for providing further support and engagement of the bracket 160 relative to the door 14.

The door 14 defines and includes a first U-shaped opening or recess 168 and a second U-shaped opening or recess 170. Each opening includes a flexible and bendable region 172 which enables a flexible tab 174 to flex relative to the door 14. Positioned adjacent to each opening 168 and 170 is an arcuate receiving portion 176 that is bent along arcuate region 178 and opened along opening or recess 180. Extending between the first U-shaped opening 168 and the second U-shaped opening 170 is an elongated opening 182. Each arcuate portion 176 receives the projections 162, via the opening 180, while the projection 166 is received within the elongated opening 182.

In this regard, to firmly secure the bracket 160 to the door 14, the projections 62 are aligned adjacent to the openings 180 in the bent arcuate portion 176, as shown in FIG. 10b. Once aligned with the openings 180, the bracket 160 is rotated counterclockwise, thereby passing the projections 162 into openings or recess 180 and beneath the arcuate portion 176. As this occurs, the flexible tab 174 flexes slightly to enable full engagement of the bracket 160 relative to the door 14. With the bracket positioned substantially perpendicular to the door 14, the projection 166 snappingly engages the slot or opening 182, as shown in FIG. 10c. This firmly secures and retains the bracket 160 substantially perpendicular to the door 14 in the second operative position without the need for a time consuming installation or tools.

Figure 11A:
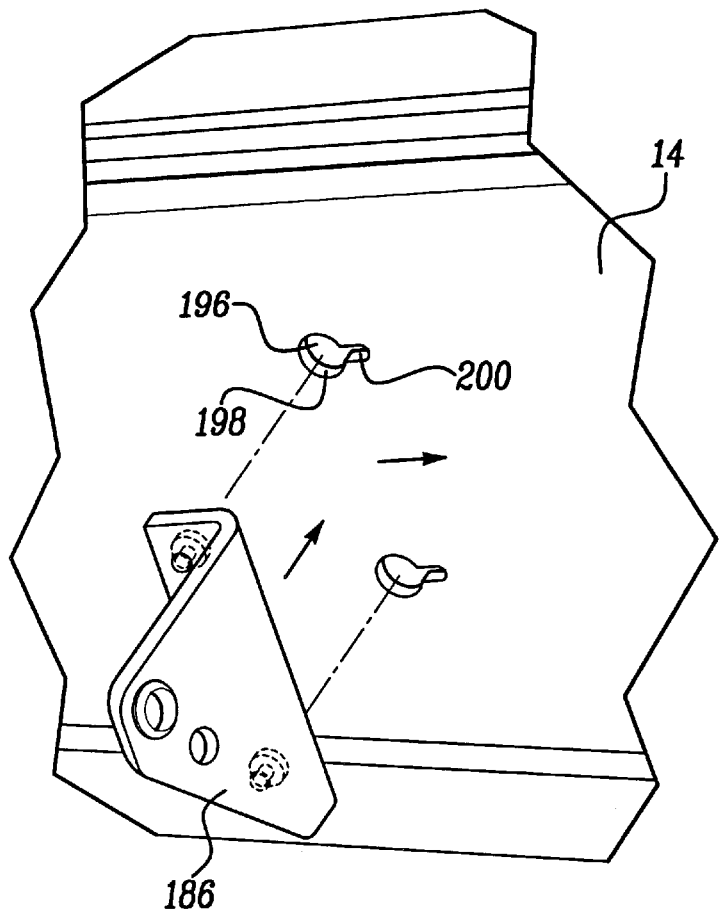
FIGS. 11a–11b illustrate a bracket according to the teachings of a fifth preferred embodiment of the present invention.
Figure 11B:
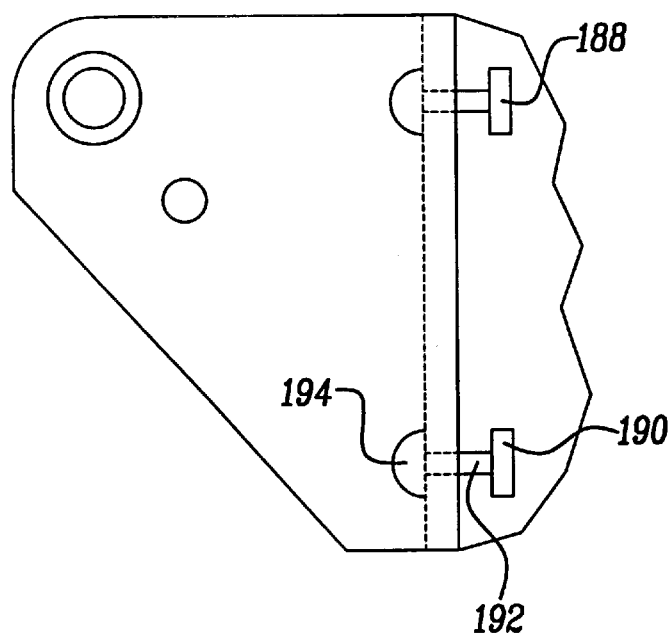

Referring now FIGS. 11a–11b, a bracket 186 according to the teachings of a fifth preferred embodiment of the present invention is shown. Here again, like reference numerals will be used to identify like structures with respect to the previous disclosed brackets. The bracket 186 is also shipped separate from the door 14 in a first non-operative position and installed on the door 14 on site to a second operative position without the need for tools. The bracket 186 includes a pair of projections 188 extending substantially perpendicular from the bracket 186. Each projection 188 includes a substantially circular head 190 and a substantially cylindrical extension 192 which is secured to the bracket 186 by way of a deformed region 194. Those skilled in the art would also recognize that the projection 188 may be secured to the bracket 186 by any other appropriate means, such as welding, screwing, etc. and may also have various other shapes, such as square, rectangular, triangular, etc. Extending through the door 14 are a pair of openings or recesses 196 defined by a substantially circular sidewall 198 and a key slot 200.

In operation, once the door and frame assembly 12 has been installed on the appropriate structure, the bracket 186 which is packaged separate from the door 14 in a first non-operative position is secured to the door 14 in a second operative position. In this regard, the projections 188 are passed through the openings or recesses 196 with the bracket 186 being slid to the right while the extensions 192 engage the key slots 200, thereby easily and effectively securing the bracket 186 to the door 14 without the need for tools or time consuming labor. Here again, by packaging the bracket 186 separate from the door in a first non-operative position, damage to an extended bracket during packaging and shipping is eliminated while also eliminating the difficulty in packaging and shipping such a device.

Figure 12A:
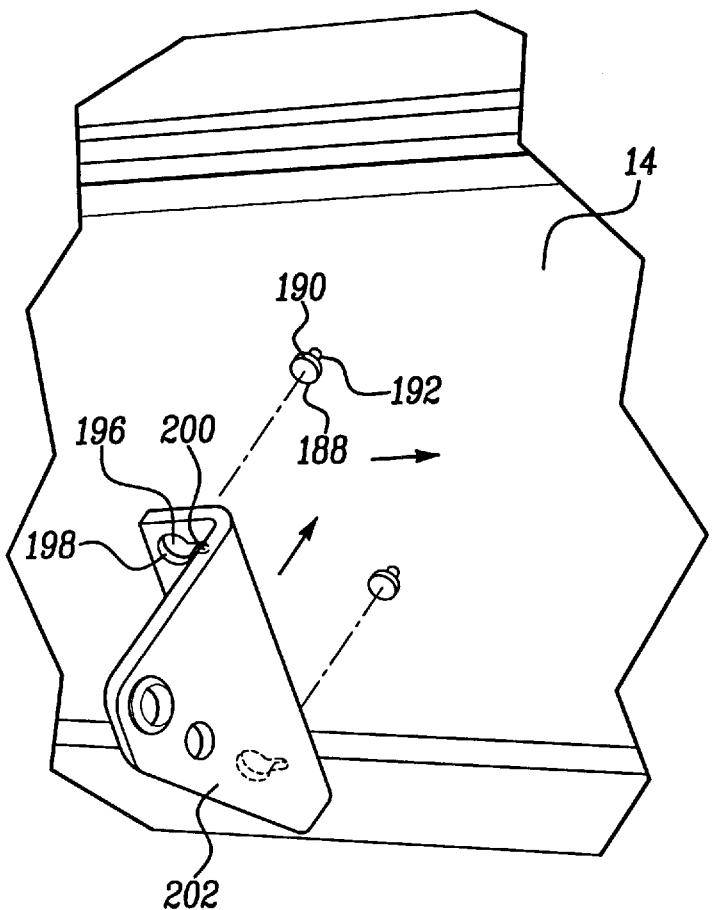
FIGS. 12a–12b illustrate a bracket according to the teachings of a sixth preferred embodiment of the present invention.
Figure 12B:
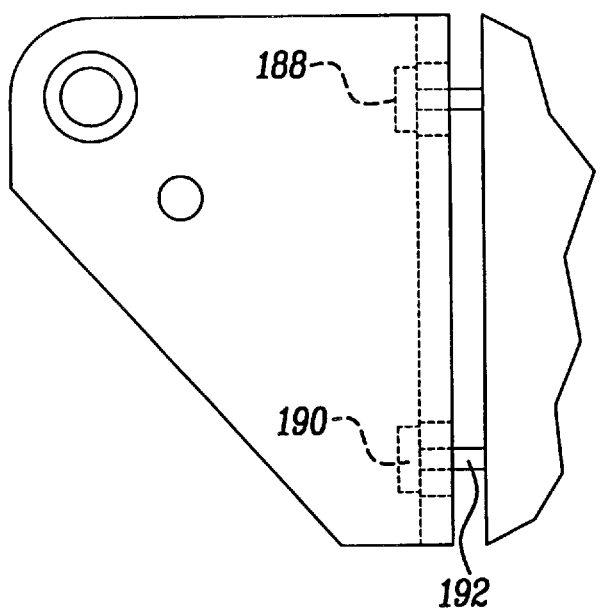

A bracket 202 according to the teachings of a sixth preferred embodiment in the present invention is shown in FIGS. 12a–12b. Here again, like reference numerals will be used to identify like structures with respect to the previous disclosed brackets. In this embodiment, the projections 188 are secured to the door 14 by the deformable region 194 as opposed to extending from the bracket 202. Likewise, the openings or recesses 196 extend through the bracket 202 as opposed to extending through the door 14. Here again, the bracket 202 is easily fixedly secured to the door 14 without the need of any tool by simply passing the projections 188 extending from the door 14 through the openings 96 and sliding the bracket 202 to the left, thereby engaging the extensions 192 within the key slots 200. This again positions the bracket 202 from a first non-operative separate position to a second operative fixed position where the bracket 202 extends substantially perpendicular to the door 14 similar to bracket 10.

Figure 13A:
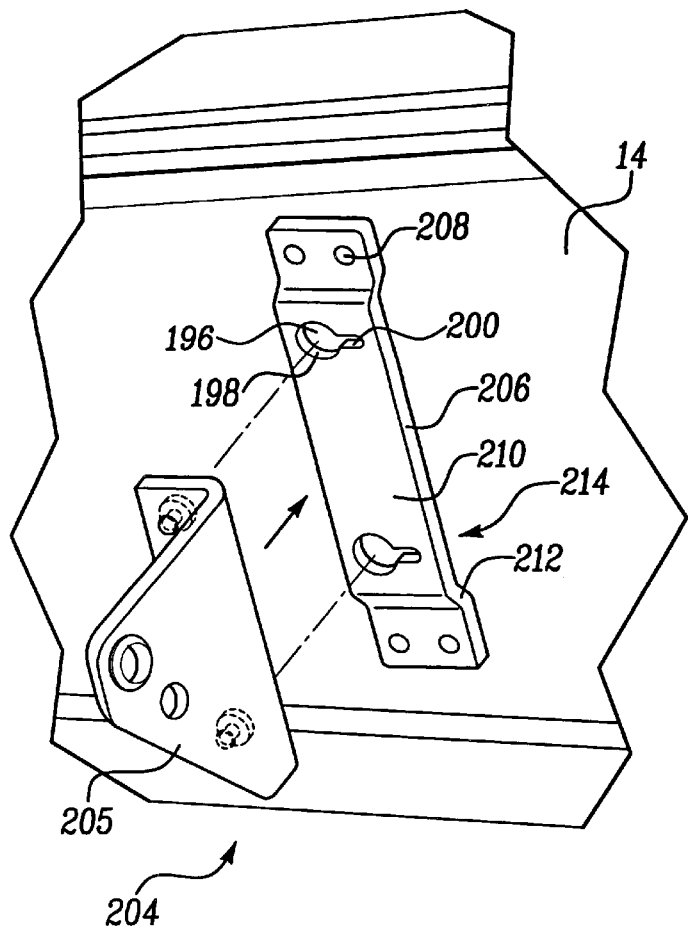
FIGS. 13a–13b illustrate a bracket according to the teachings of a seventh preferred embodiment of the present invention.
Figure 13B:
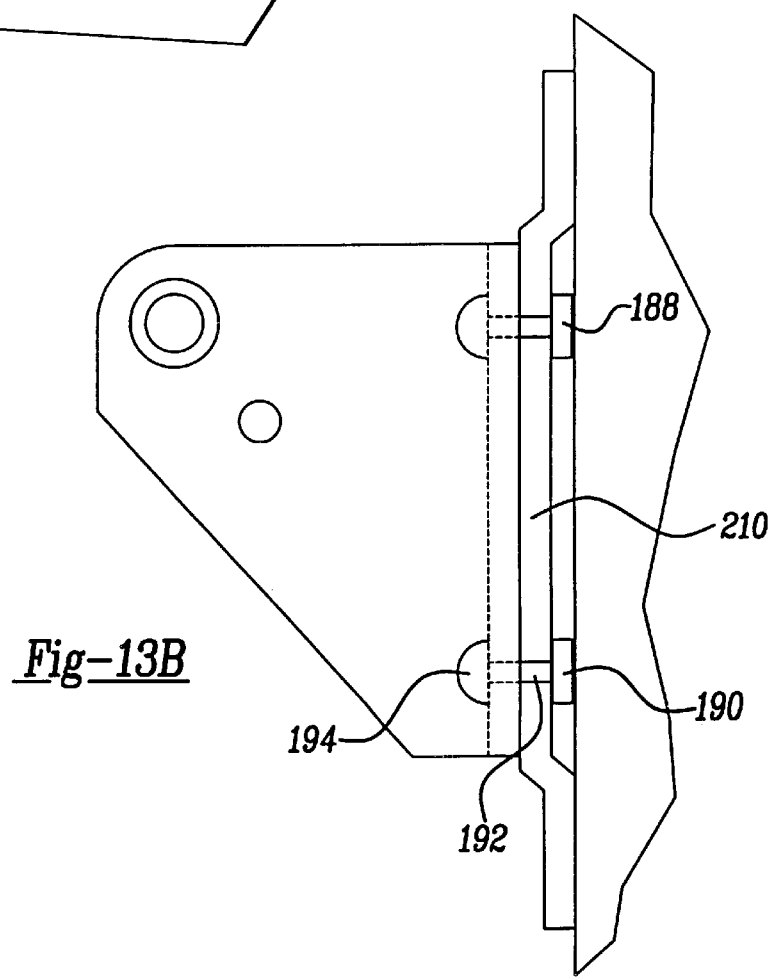

A bracket assembly 204 according to the teachings of a seventh preferred embodiment of the present invention as shown in FIGS. 13a–13b. Here again, like reference numerals will be used to identify like structures with respect to the previously disclosed brackets. The bracket assembly 204 is substantially identical to the bracket 186 having the projections 188. The only difference with the bracket assembly 204 is that the projections 188 extend through openings 196 which pass through a separate bracket or projection 206 secured to the door 14 by means of spot welds 208 or other appropriate fixation, such as screws, gluing, etc. The bracket 206 includes a substantially planar clearance member 210 extending from angled portions 212 which provides for clearance of the projections 188 between the bracket 206 and the door 14. Once again, the bracket 205 is secured to the door 14 by way of passing the projections 188 through the openings 196 and moving the bracket 205 to the right to engage the extensions 192 within the key slots 200, such that the projections 188 extend between the recess 214 formed between the bracket 206 and the door 14.

Figure 14A:
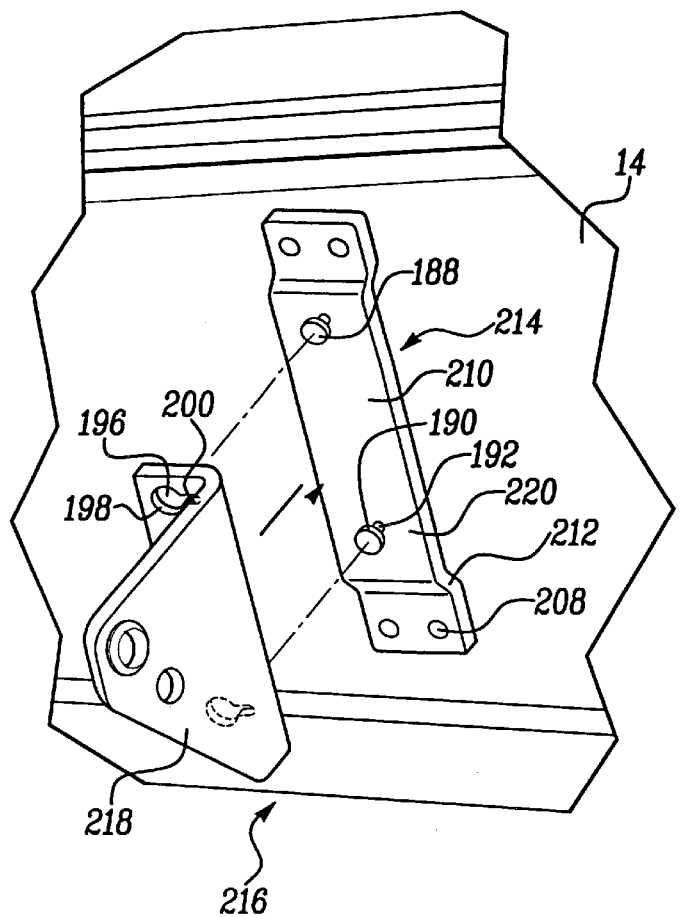
FIGS. 14a–14b illustrate a bracket according to the teachings of an eighth preferred embodiment of the present invention.
Figure 14B:
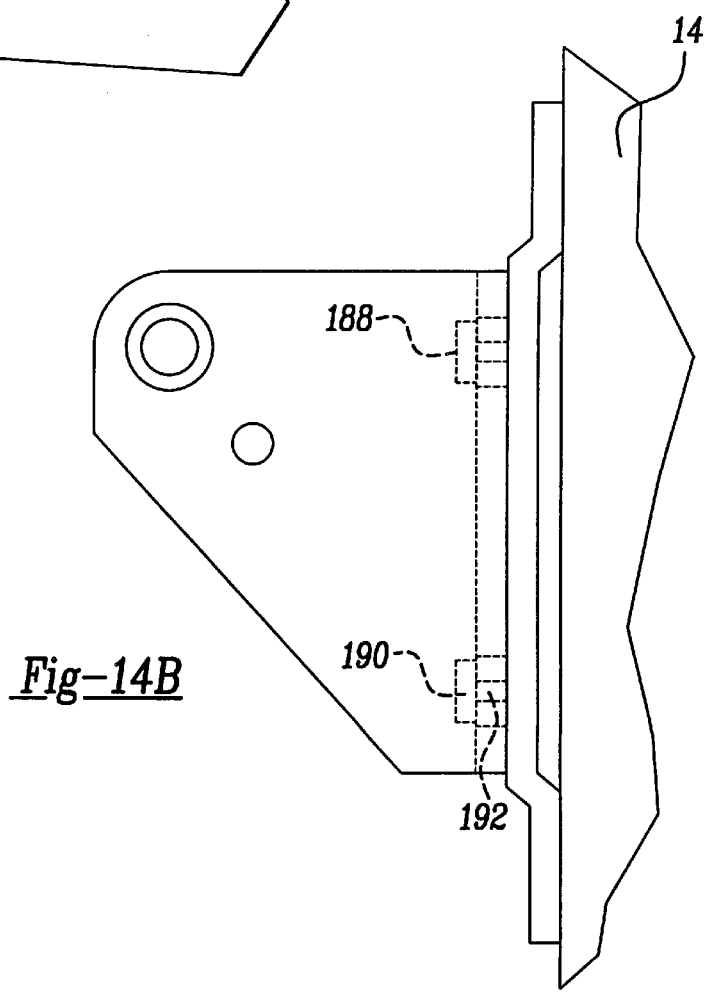
Figure 15A:
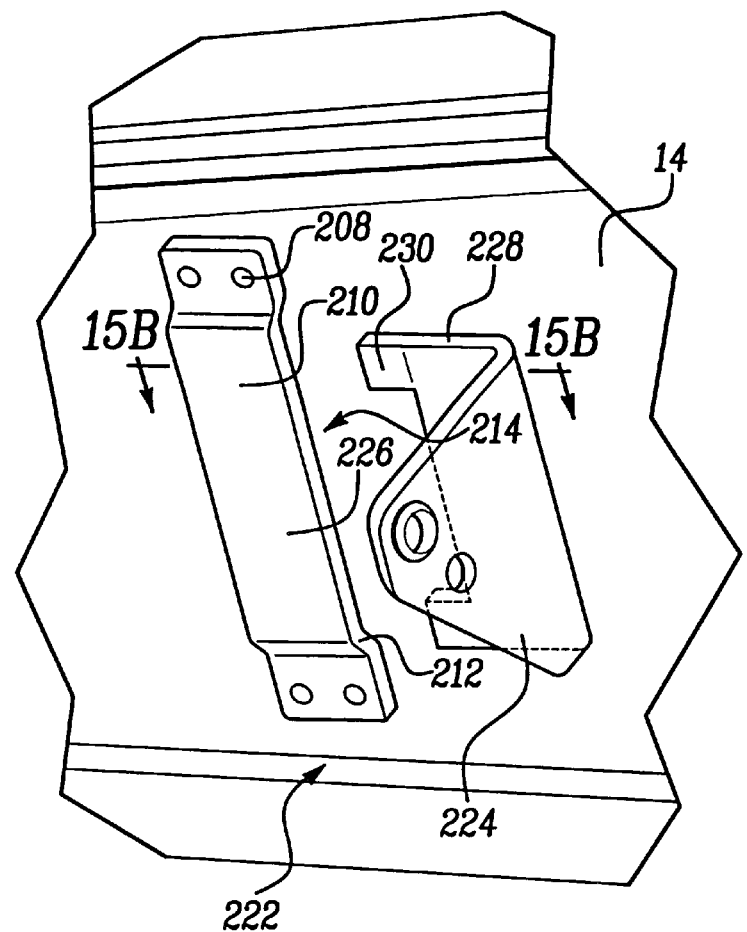
FIGS. 15a–15b illustrate a bracket according to the teachings of a ninth preferred embodiment of the present invention.
Figure 15B:
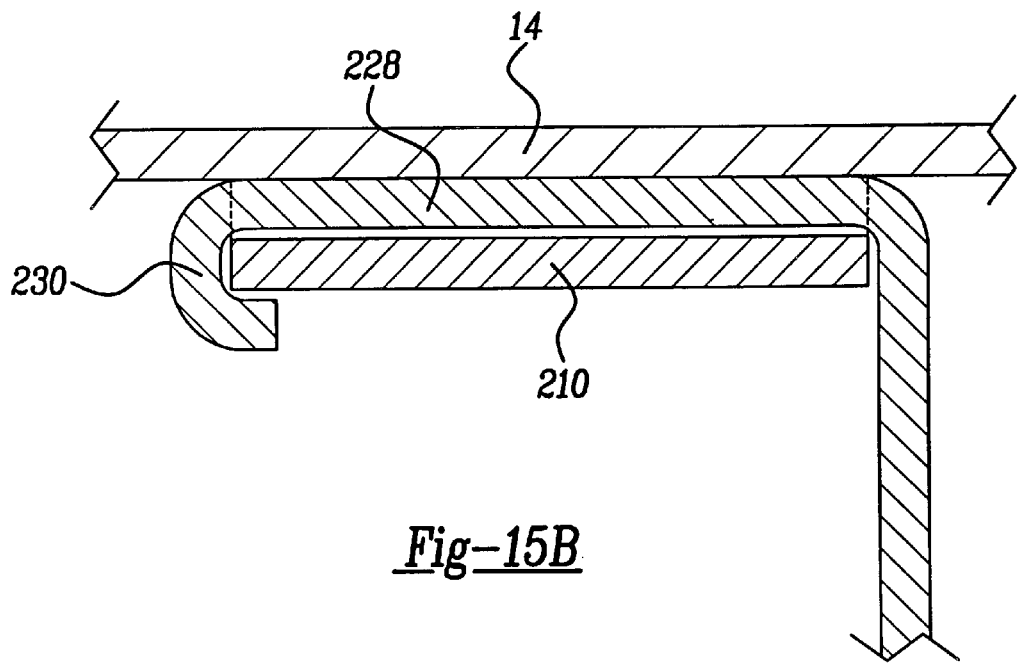

Referring now FIGS. 14a and 14b, a bracket assembly 216 according to the teachings of an eighth preferred embodiment of the present invention is shown. Here again, like reference numerals will be used to identify like structures with respect to the previously disclosed brackets. The bracket assembly 216 includes a first bracket member 218 which is substantially similar to the bracket 202 and a second bracket member 220. The only difference between the bracket assembly 216 and the bracket assembly 204 is that the first bracket member 218 includes the openings 196 and the second bracket member 220 includes the projections 188 which is opposite to that shown in FIGS. 13*a*–13*b*.

In this embodiment, the recess 214 provides for clearance of the deformable region 194 between the bracket 220 and the door 14. In use, the first bracket member 218 is mated with the second bracket member 220 by aligning the openings 196 of the bracket 218 with the projections 188 of the bracket 220. Once aligned, the first bracket member 218 is slid to the left to engage the extensions 192 within the key slots 200, thereby fixedly securing the first bracket member 218 to the second bracket member 220 which secures the first bracket member 218 substantially perpendicular to the door 14 in an operative position without the use of tools.

Finally, referring to 15*a*–15*b*, a bracket assembly 222 according to teachings of a ninth preferred embodiment of the present invention is shown. Here again, like reference numerals will be used to identify like structures with respect to the other disclosed brackets. The bracket assembly 222, includes a first bracket member 224 and a second bracket member 226. The second bracket member 226 is substantially similar to the bracket members 206 and 220, except that the bracket member 226 does not include either the projections 188 or the openings 196. The first bracket member 224 is substantially similar to the first bracket member 205 and a first bracket member 218, except that the first bracket member 224 also does not include either the projections 188 or the openings 196. Instead, the first bracket member 224 includes a first angled flange or projection 228 and a plurality of bendable tabs or projections 230. The bracket 224 is substantially perpendicular to the first projection 228.

In use, the first bracket member 224 slidably engages the recess 214 defined between the bracket 226 and door 14 by sliding the first projection 228 and the second fastening projections 230 within the recess 214. In this regard, the first projection 228 is aligned substantially along the same plane as the door 14 with the remaining portion of the bracket 224 extending or cantilevering substantially perpendicular from the door 14. To retain the first bracket member 224 within the bracket 226, the plurality of bendable projections 230 are simply bent counterclockwise to prevent the first bracket member 224 from sliding out from under the recess 214. This fixedly secures the bracket 224 relative to the door 14 without the need for any tools.

Figure 16:
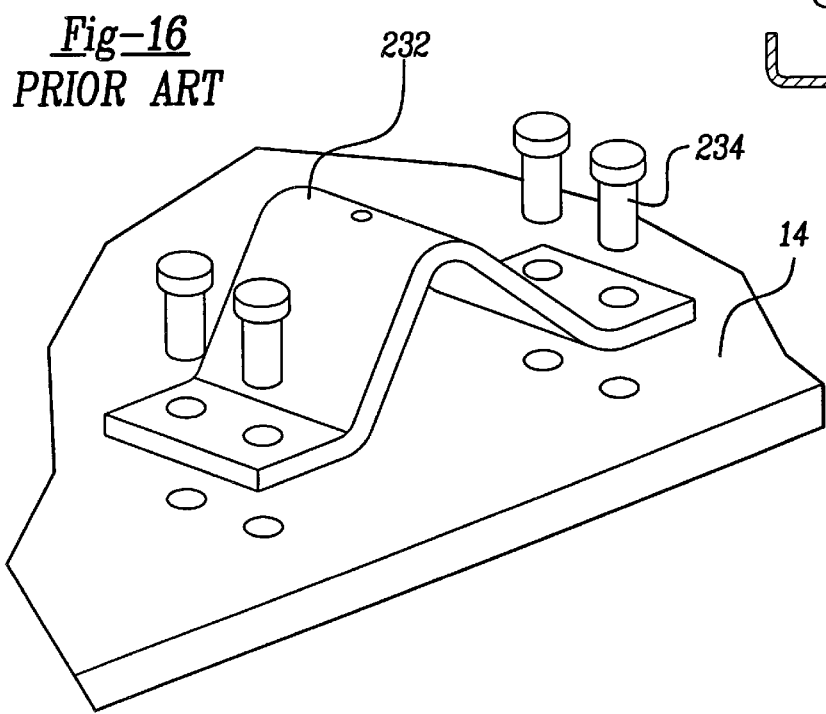
FIG. 16 is an exploded view of a prior art bracket and ventilation door.

Referring to FIG. 16, an exploded perspective view of a prior art bracket 232 is shown in operative proximity to the door 14. The bracket 232 consists of a bent member that is shipped separately from the door 14. The bracket 232 is subsequently installed onto the door 14 by way of four separate pop rivets 234. As was previously noted, the significant disadvantages associated with this prior art bracket 232 is that the bracket 232 and the rivets 234 are shipped separately and require subsequent assembly after the ventilation door and frame assembly 12 has been installed in the poultry house 74. With multiple assemblies 12 being installed in the poultry house 74, the step of subsequently attaching each individual bracket 232 to each door 14 by way of multiple pop rivets 234 and tools is very time consuming. Accordingly, the brackets according to the teachings of the present invention eliminate these disadvantages to provide a bracket which is either pre-assembled to the doors in a substantially flat and flush manner and may be simply bent to be put into operation or easily attached to the door in an operative position without the use of tools, thereby substantially reducing the overall assembly time, cost and complexity.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for enabling an opening and closing of a hinged door, said method comprising:

providing a body member movably coupled to the hinged door and substantially flush with the hinged door;

bending the body member so that the body member substantially cantilevers out from the hinged door;

attaching a linkage mechanism to the body member; and opening and closing the hinged door at a site remote from the hinged door by way of the linkage mechanism.

2. The method as defined in claim 1 wherein providing a body member movably coupled to the hinged door further comprises providing a body member movably coupled to the hinged door by way of a plurality of rivets.

3. The method as defined in claim 1 wherein providing a body member movably coupled to the hinged door further comprises providing a body member movably coupled to the hinged door by way of forming the body member from the hinged door.

4. The method as defined in claim 1 further comprising bending the body member to provide a weighting member to weight the body member relative to the hinged door.

5. The method as defined in claim 1 further comprising bending the body member so that the body member substantially cantilevers out from the hinged door substantially perpendicular to the hinged door.

6. The method as defined in claim 1 wherein bending the body member further comprises forming a bendable region with a plurality of elongated openings.

7. The method as defined in claim 1 wherein bending the body member further comprises bending the body member without the use of tools.

8. A method for enabling an opening and closing of a hinged door, said method comprising:

providing a hinged door operable to be opened and closed;

providing a body member for assisting in the opening and closing of the hinged door;

positioning the body member from a first non-operative position to a second operative position relative to the hinged door without the use of a tool to permit the mechanical opening and closing of the hinged door;

attaching a linkage mechanism to the body member; and opening and closing the hinged door at a site remote from the hinged door by way of the linkage mechanism.

9. The method as defined in claim 8 wherein providing a body member further comprises providing the body member movably coupled to the hinged door by way of a plurality of rivets, and wherein positioning the body member includes bending the body member from a first non-operative position to a second operative position.

10. The method as defined in claim 8 wherein providing the body member further comprises providing a body member movably coupled to the hinged door by way of forming the body member from the hinged door, and wherein positioning the body member includes bending the body member from a first non-operative position to a second operative position.

11. The method as defined in claim 8 wherein providing the body member further comprises providing a separate body member, and wherein positioning the separate body member includes locating the separate body member in a first non-operative detached position and locating the separate body member in a second operative position by fixedly attaching the separate body member to the hinged door without the use of any tool.

12. The method as defined in claim 11 wherein providing said separate body member further includes providing at least one recess and at least one projection associated with the separate body member and the hinged door.

13. The method as defined in claim 12 wherein at least one projection extends from the body member and the at least one recess is defined by at least a portion of the hinged door.

14. The method as defined in claim 12 wherein the projection extends from the hinged door and the recess is defined by the body member.

15. A method for enabling an opening and closing of a hinged door, said method comprising:

provyding a hinged door operable to be opened and closed;

forming a body member from the hinged door;

forming a bendable region adjacent the body member by way of a plurality of elongated openings;

bending the bendable region so that the body member substantially cantilevers out from the hinged door;

attaching a linkage mechanism to the body member; and opening and closing the hinged door at a side remote from the hinged door by way of the linkage mechanism.

16. The method as defined in claim 15 wherein bending the body member further comprises bending the body member without the use of tools.

17. The method as defined in claim 15 wherein attaching the linkage mechanism further comprises attaching the linkage mechanism to an attachment mechanism formed in the body member.

18. The method as defined in claim 15 further comprising securing the hinged door to a poultry house.

* * * * *

UNITED STATES PATENT AND TRADEMARK OFFICE
CERTIFICATE OF CORRECTION

PATENT NO. : 6,061,968
DATED : May 16, 2000
INVENTOR(S) : Leon S. Zimmerman et al.

It is certified that error appears in the above-identified patent and that said Letters Patent is hereby corrected as shown below:

Title page,
Item [56], OTHER PUBLICATIONS, item 4, "Ultrapan" should be -- ULTRAPAN --

Column 4,
Line 33, "9a-9b" should be -- 9A-9B --
Line 35, "10a-10c" should be -- 10A-10C --
Line 39, "11a-11b" should be -- 11A-11B --
Line 42, "12a-12b" should be -- 12A-12B --
Line 45, "13a-139b" should be -- 13A-13B --
Line 48, "14a-14b" should be -- 14A-14B --
Line 51, "15a-15b" should be -- 15A-15B --

Column 8,
Line 43, "9a-9b" should be -- 9A-9B --

Column 9,
Line 11, "10a-10c" should be -- 10A-10C --
Line 42, "10b" should be -- 10B --
Line 50, "10c" should be -- 10C --
Line 54, "11a-11b" should be -- 11A-11B --

Column 10,
Line 23, "12a-12b" should be -- 12A-12B --
Line 40, "as" should be -- is --
Line 41, "13a-13b" should be -- 13A-13B --
Line 59, delete "FIGS. 14a and 14b" and substitute "to FIGS. 14A-14B -- therefor

UNITED STATES PATENT AND TRADEMARK OFFICE
CERTIFICATE OF CORRECTION

PATENT NO.    : 6,061,968
DATED         : May 16, 2000
INVENTOR(S)   : Leon S. Zimmerman et al.

It is certified that error appears in the above-identified patent and that said Letters Patent is hereby corrected as shown below:

Column 11,
Line 3, "13a-13b" should read -- 13A-13B --
Line 15, "15a-15b" should read -- 15A-15B --

Signed and Sealed this

Twenty-sixth Day of March, 2002

*Attest:*

JAMES E. ROGAN
*Attesting Officer*          *Director of the United States Patent and Trademark Office*